United States Patent Office 2,705,690
Patented Apr. 5, 1955

2,705,690

FLEXIBLE SHEET MATERIAL AND METHOD

Harold T. Nelson, Mishawaka, and Raymond A. Pancheri, South Bend, Ind., assignors to United States Rubber Company, New York, N. Y., a corporation of New Jersey No Drawing. Application June 5, 1953,
Serial No. 359,946

6 Claims. (Cl. 117—138.8)

This invention relates to flexible sheet materials comprising a flexible sheet or film of plasticized polyvinyl chloride or a resinous copolymer of a major proportion of vinyl chloride and a minor proportion of a copolymerizable monomer typified by vinyl acetate. More particularly it relates to a slip finish for such flexible sheet materials and to the method of obtaining the same.

Flexible sheet material comprising a flexible sheet or film of polyvinyl chloride or a copolymer of vinyl chloride and a copolymerizable monomer typified by vinyl acetate is a well known article of manufacture and has found wide acceptance, particularly as upholstery material. However, the necessity of using a considerable proportion of a plasticizer, almost invariably a high-boiling organic liquid, in conjunction with the vinyl resin, in order to impart the desired flexibility and other properties to the coating, has caused the exposed surface of the sheet or film to exhibit an undesirable stickiness and relatively high frictional coefficient with respect to the clothing of a user of an automobile or piece of furniture upholstered with the sheet material. The present invention is concerned with means for imparting a completely satisfactory slip finish to the exposed surface of such sheet material.

The sheet of plasticized vinyl resin may be unsupported in which case it is termed "film" or it may have a textile fabric backing which may be woven or knit. A knit fabric backing is commonly employed in the case of an elastic or stretchable material. The fabric-backed sheet material is commonly made by calendering a plasticized vinyl resin onto the fabric in a manner now well-known to those skilled in the art. Our invention is equally applicable to the unsupported vinyl resin film and to the fabric-backed resin sheet.

We have discovered that a slip finish can be imparted to vinyl resin sheet materials of the type described above in a simple and commercially feasible manner by applying to the exposed surface thereof a coating of a composition comprising a solution of resinous polyethyl methacrylate, resinous polymethyl methacrylate, a vinyl resin selected from the group consisting of polyvinyl chloride and copolymers of a major proportion of vinyl chloride and a minor proportion of vinyl acetate, and either a silicone fluid or a soluble silicone rubber in a mutual volatile organic solvent, and volatilizing the solvent to deposit a thin homogeneous coating of the solids contained in the solution.

The resinous polyethyl methacrylate, the resinous polymethyl methacrylate, the vinyl resin and the silicone fluid or rubber cooperate to form a slip finish which has the property of being tenaciously adherent to the surface of the plasticized vinyl resin sheet with the desired degree of coefficient of friction so that the undesirable stickiness and high coefficient of friction of the plasticized vinyl resin layer are overcome, an attractive appearance, and the other attributes required in an acceptable slip finish.

The three resinous components provide the necessary body and adhesion to the plasticized vinyl resin layer. The silicone exhibits the property of lubricating the surface of the resulting slip finish so that it has a low coefficient of friction and is free from stickiness to the clothing even in hot and humid weather.

The relative proportions of the three resinous constituents of our slip finish can be varied with resulting variation in the properties of the resulting finish. We prefer to employ them in the following proportions:

| | Per cent by weight |
|---|---|
| Polyethyl methacrylate | 20–50 |
| Polymethyl methacrylate | 30–40 |
| Polyvinyl chloride or vinyl chloride-vinyl acetate or like copolymer | 10–50 |

By varying the proportion of the vinyl resin relatively to the two other resins, the brightness of the resulting finish can be varied. As the relative proportion of the vinyl resin is increased the brightness of the finish is increased.

The relative proportions of polyethyl methacrylate and polymethyl methacrylate with respect to each other can be varied to secure the desired hardness. The suitable slip finish should be firm and abrasion-resistant but should not be either too soft or too hard. Since polymethyl methacrylate is harder than polyethyl methacrylate, by increasing the proportion of polymethyl methacrylate relative to polyethyl methacrylate the hardness of the finish can be increased, other factors being unchanged. Use of the relative proportions given above yields extremely satisfactory results.

We prefer that the silicone component be uncured silicone rubber. This is a well-known material and is often made by heating a silicone oil, e. g., liquid dimethyl silicone with ferric chloride to effect conversion from the oily state to an elastic condition in which is resembles "gum" rubber. The preparation of one such silicone rubber is shown in U. S. Patent to Scott 2,430,032. Silicone rubber is further described in Rochow, "Chemistry of the Silicones," second edition, 1951, published by John Wiley & Sons, Inc., New York, and particularly pages 94 to 97 thereof. We use the uncured silicone rubber which is soluble in the ordinary organic solvents such as ketones.

Instead of using silicone rubber, we can though much less preferably employ a silicone fluid. The silicone fluids have a consistency ranging from a light oil-like liquid to a heavy jelly or grease. Examples are dimethyl silicone fluids, diethyl silicone fluids and alkyl-aryl silicone fluids. Silicone fluids are more fully described in chapter 6 of the above-cited book of Rochow and in U. S. Patents 2,258,218; 2,377,689; 2,384,384; 2,469,888; 2,491,843; and 2,547,694.

The silicone rubber is preferred to the fluid because it is necessary to use an amount of the rubber equal to only about one-fourth the amount of the silicone fluid required to give a good slip finish. Thus, we obtain excellent results using from 0.3 to 1.0 part of silicone rubber per 100 parts of the three resinous components of our composition. In contrast, it is necessary to use from 1.2 to 4.0 parts of a silicone fluid per 100 parts of the three resins. Since the silicones are expensive materials it will be seen that the advantage is greatly with the silicone rubber.

In practicing our invention we first make up the coating composition by dissolving the polyethyl methacrylate, the polymethyl methacrylate, the polyvinyl chloride or vinyl chloride-vinyl acetate copolymer and the silicone in a suitable solvent which is a solvent for all of the resins. Any conventional method of dissolving can be used, the method not being critical. The resulting lacquer is then applied in any conventional manner to the surface of the plasticized vinyl resin sheet material. The method of coating is not critical so long as the method yields a continuous layer of the slip finish on the surface of the plasticized vinyl resin sheet material. We can use any suitable coating machinery such as that known in the art as "a reverse-roll coater" or that known as an "overall print roll." Alternatively, we can use a spreader bar or roller applicator. A thin coating is adequate. We typically apply such an amount of the lacquer as to furnish approximately 0.3–0.5 ounce of dry solids per square yard of base material. The amount applied can be as low as 0.2 ounce, ranging upwardly from this figure to 0.7 ounce. Amounts less than 0.2 ounce per square yard are insufficient to give the desired continuous film while amounts in excess of 0.7 ounce are prohibitively expensive.

The amount of solvent used in making the coating composition will usually be such as to give a composition containing from 7 to 15% by weight of the three resins. The solvent could be a single material but will usually comprise a mixture of materials, such as a mixture of a suitable ketone with an aromatic hydrocarbon diluent. An example is a mixture of methyl ethyl ketone and xylol, with or without cyclohexanone. Usually the ketone content will exceed the hydrocarbon content.

The following examples illustrate our invention more fully. All parts are by weight.

*Examples 1 and 2*

The following formulations, when applied to supported or unsupported plasticized vinyl resin sheeting, give a bright and a semi-bright slip finish having excellent characteristics:

|  | Example 1 (Bright) | Example 2 (Semi-Bright) |
|---|---|---|
| Polyethyl Methacrylate | 25 | 45 |
| Polymethyl Methacrylate | 35 | 35 |
| Vinyl Chloride-Vinyl Acetate Copolymer | 40 | 20 |
| Dimethyl Silicone Rubber | 0.5 | 0.6 |
| Wax | 1 | 3 |
| Methyl Ethyl Ketone | 770 | 400 |
| Cyclohexanone | 70 | |
| Xylol | 205 | 225 |

The wax may be any hard wax. Examples are "Ceresin" and "Opalwax." Use of the wax is optional since it contributes but slightly to the anti-friction qualities of the finished lacquer.

The vinyl chloride-vinyl acetate copolymer resin was one sold commercially by the Bakelite Company under the trade-name 'VYNW" andw as a resinous copolymer of 93–95% vinyl chloride and 7–5% vinyl acetate.

The polyethyl methacrylate was prepared by emulsion polymerization of ethyl methacrylate in the presence of a mixture of $C_{12}$, $C_{14}$ and $C_{16}$ tertiary alkyl mercaptans. To make this resin the following ingredients were charged to the polymerizer:

| | |
|---|---|
| Ethyl methacrylate monomer | 100 |
| Mixed tertiary mercaptans | 0.5 |
| Potassum persulfate | 0.3 |
| "Aerosol AY" (diamyl ester of sodium sulfosuccinic acid) | 3.0 |
| Water | 200 |

The foregoing charge was maintained at 50° C. for 27 hours by means of a water bath with mechanical arrangements for keeping the material in continual agitation throughout the reaction period. At the end of the reaction time the emulsion was coagulated and the coagulum was washed and dried in the conventional way. A satisfactory grade of polyethyl methacrylate can be prepared using from 0.05 to 0.5 of the mixed mercaptans and the percent conversion can range from 89 to 99%.

Instead of using ethyl methacrylate polymer made in the foregoing manner, we can use any of the commercially available polyethyl methacrylates such as those sold under the trade-names "Acryloid B-7" and "Hypalon HG-24."

The polymethyl methacrylate used in the above formulations was made in the same way as the polyethyl methacrylate except that the reaction time was only 12 hours and the charge was as follows:

| | |
|---|---|
| Methyl methacrylate monomer | 100 |
| Mixed tertiary mercaptans | 0.5 |
| Potassium persulfate | 0.3 |
| "Ultrawet 35 KX" (sodium dodecyl benzene sulfonate) | 3 |
| Water | 200 |

The amount of the mixed mercaptans can be varied from 0.1 part which will give a product having an intrinsic viscosity in toluene of approximately 2.3 upwardly to a 0.5 part which will give a product having an intrinsic viscosity in toluene of approximately 1.00. Any amount between 0.1 and 0.5 part will give a product which is suitable for use in our formulation.

Instead of using polymethyl methacrylate made as just described, we can use the commercially available polymethyl methacrylates such as those known in the trade as "Acryloid A-10" and "Hypalon HG-41."

From the foregoing description it will be seen that the present invention provides a simple means of obtaining a highly satisfactory slip finish on plasticized vinyl resin sheet maerial. A marked advantage of the slip finish of our invention is that it has a good luster which is demanded by the trade. This is in contrast to the dull finish which is obtained when the vinyl resin component is dispersed or suspended, as for example in the manner described in U. S. Patent No. 2,439,051.

In place of the polyvinyl chloride or vinyl chloride-vinyl acetate copolymer used in the sheet material and in the slip finish we have with equivalent results used a resinous copolymer of a major proportion of vinyl chloride and a minor proportion of diethyl maleate, for example that known commercially as "Pliovic AO." In general we can use polyvinyl chloride or any thermoplastic resinous copolymer of a major proportion of vinyl chloride and a minor proportion of a copolymerizable monomer, e. g., vinyl acetate, diethyl maleate, diethyl fumarate, vinylidene chloride, etc.

Having thus described our invention, what we claim and desire to protect by Letters Patent is:

1. Flexible sheet material adapted for use as upholstery material or the like and comprising a sheet of plasticized vinyl resin selected from the group consisting of polyvinyl chloride and copolymers of a major proportion of vinyl chloride and a minor proportion of a copolymerizable monomer, said sheet having on its surface a slip finish layer of a mixture of resinous polyethyl methacrylate, resinous polymethyl methacrylate, a vinyl resin selected from the said group, and a silicone selected from the group consisting of silicone fluids and soluble silicon rubbers, the proportions of the three resinous materials being within the following ranges:

| | Per cent |
|---|---|
| Polyethyl methacrylate | 20–50 |
| Polymethyl methacrylate | 30–40 |
| Vinyl resin | 10–50 | said percentages being by weight and totalling 100%, the amount of said silicone fluid being equal to from 1.2 to 4.0 parts and the amount of said soluble silicone rubber being equal to from 0.3 to 1.0 part per 100 parts of the three resinous materials.

2. Flexible sheet material adapted for use as upholstery material or the like and comprising a sheet of plasticized vinyl resin selected from the group consisting of polyvinyl chloride and copolymers of a major proportion of vinyl chloride and a minor proportion of a copolymerizable monomer, said sheet having on its surface a slip finish layer of a mixture of resinous polyethyl methacrylate, resinous polymethyl methacrylate, a vinyl resin selected from the said group, and soluble silicone rubber, the proportions of the three resinous materials being within the following ranges:

| | Per cent |
|---|---|
| Polyethyl methacrylate | 20–50 |
| Polymethyl methacrylate | 30–40 |
| Vinyl resin | 10–50 | said percentages being by weight and totalling 100%, the amount of said soluble silicone rubber being equal to from 0.3 to 1.0% based on the sum of the three resinous materials.

3. Flexible sheet material adapted for use as upholstery material or the like and comprising a fabric backing carrying a layer of plasticized vinyl resin selected from the group consisting of polyvinyl chloride and copolymers of a major proportion of vinyl chloride and a minor proportion of vinyl acetate, said layer having on its surface a slip finish layer of a mixture of resinous polyethyl methacrylate, resinous polymethyl methacrylate, a vinyl resin selected from the said group, and soluble silicone rubber, the proportions of the three resinous materials being within the following ranges:

| | Per cent |
|---|---|
| Polyethyl methacrylate | 20–50 |
| Polymethyl methacrylate | 30–40 |
| Vinyl resin | 10–50 | said percentages being by weight and totalling 100%, the amount of said soluble silicone rubber being equal to from 0.3 to 1.0% based on the sum of the three resinous materials.

4. The process of providing a flexible sheet material adapted for use as upholstery material or the like and comprising a sheet of plasticized vinyl resin selected from the group consisting of polyvinyl chloride and copolymers of a major proportion of vinyl chloride and a minor proportion of a copolymerizable monomer with a slip finish which comprises applying on the surface of said sheet a coating of a composition comprising a solution of resinous polyethyl methacrylate, resinous polymethyl methacrylate, a vinyl resin selected from the said group, and a silicone selected from the group consisting of silicone fluids and soluble silicone rubbers in a mutual volatile organic solvent, the proportions of the three resinous materials being within the following ranges:

| | Per cent |
|---|---|
| Polyethyl methacrylate | 20–50 |
| Polymethyl methacrylate | 30–40 |
| Vinyl resin | 10–50 | said percentages being by weight and totalling 100%, the amount of said silicone fluid being equal to from 1.2 to 4.0 parts and the amount of said soluble silicone rubber being equal to from 0.3 to 1.0 part per 100 parts of the three resinous materials and volatilizing said solvent.

5. The process of providing a flexible sheet material adapted for use as upholstery material or the like and comprising a sheet of plasticized vinyl resin selected from the group consisting of polyvinyl chloride and copolymers of a major proportion of vinyl chloride and a minor proportion of a copolymerizable monomer with a slip finish which comprises applying on the surface of said sheet a coating of a composition comprising a solution of resinous polyethyl methacrylate, resinous polymethyl methacrylate, a vinyl resin selected from the said group, and a soluble silicone rubber in a mutual volatile organic solvent, the proportions of the three resinous materials being within the following ranges:

| | Per cent |
|---|---|
| Polyethyl methacrylate | 20–50 |
| Polymethyl methacrylate | 30–40 |
| Vinyl resin | 10–50 | said percentages being by weight and totalling 100%, the amount of said soluble silicone rubber being equal to from 0.3 to 1.0% based on the sum of the three resinous materials, and volatilizing said solvent.

6. The process of providing a flexible sheet material adapted for use as upholstery material or the like and comprising a fabric backing carrying a layer of plasticized vinyl resin selected from the group consisting of polyvinyl chloride and copolymers of a major proportion of vinyl chloride and a minor proportion of a copolymerizable monomer with a slip finish which comprises applying on the exposed surface of said plasticized vinyl resin layer a coating of a composition comprising a solution of resinous polyethyl methacrylate, resinous polymethyl methacrylate, a vinyl resin selected from the said group, and a soluble silicone rubber in a mutual volatile organic solvent, the proportions of the three resinous materials being within the following ranges:

| | Per cent |
|---|---|
| Polyethyl methacrylate | 20–50 |
| Polymethyl methacrylate | 30–40 |
| Vinyl resin | 10–50 | said percentages being by weight and totalling 100%, the amount of said soluble silicone rubber being equal to from 0.3 to 1.0% based on the sum of the three resinous materials, and volatilizing said solvent.

References Cited in the file of this patent

UNITED STATES PATENTS

| Number | Name | Date |
|---|---|---|
| 2,137,636 | Barrett | Nov. 22, 1938 |
| 2,322,310 | Muskat et al. | June 22, 1943 |
| 2,361,055 | Pollack | Oct. 24, 1944 |
| 2,442,613 | Nicodemus | June 1, 1948 |
| 2,536,657 | Reese | Jan. 2, 1951 |
| 2,628,213 | Rust | Feb. 10, 1953 |
| 2,635,059 | Cheronis | Apr. 14, 1953 |
| 2,640,817 | Sheridan | June 2, 1953 |